(12) United States Patent
Kassenaar

(10) Patent No.: US 7,480,107 B2
(45) Date of Patent: Jan. 20, 2009

(54) CAMERA COMPRISING MEANS FOR ACCURATELY FIXING THE DISTANCE BETWEEN A LENS AND AN IMAGE SENSOR CHIP

(75) Inventor: Teunis Adrianus Kassenaar, Eindhoven (NL)

(73) Assignee: TPO Hong Kong Holding Limited (TW)

( * ) Notice: Subject to any disclaimer, the term of this patent is extended or adjusted under 35 U.S.C. 154(b) by 246 days.

(21) Appl. No.: 10/549,646

(22) PCT Filed: Mar. 18, 2004

(86) PCT No.: PCT/IB2004/050287

§ 371 (c)(1),
(2), (4) Date: Sep. 20, 2005

(87) PCT Pub. No.: WO2004/086114

PCT Pub. Date: Oct. 7, 2004

(65) Prior Publication Data

US 2006/0187558 A1    Aug. 24, 2006

(30) Foreign Application Priority Data

Mar. 24, 2003   (EP)   ................... 03100747

(51) Int. Cl.
*G02B 7/02* (2006.01)
(52) U.S. Cl. .................. 359/811; 359/819; 359/827
(58) Field of Classification Search .................. 359/811
See application file for complete search history.

(56) References Cited

U.S. PATENT DOCUMENTS

| 5,032,919 | A | | 7/1991 | Randmae |
| 5,177,638 | A | * | 1/1993 | Emura et al. ................. 359/704 |
| 5,268,794 | A | | 12/1993 | Chan |
| 5,523,892 | A | * | 6/1996 | Yoshibe et al. ............... 359/819 |
| 2001/0009443 | A1 | | 7/2001 | Suemoto et al. |
| 2002/0191309 | A1 | | 12/2002 | Inoue et al. |

FOREIGN PATENT DOCUMENTS

| EP | 1174748 A | 1/2002 |
| JP | 4104667 | 4/1992 |
| JP | 10170809 | 6/1998 |

* cited by examiner

*Primary Examiner*—Jessica T Stultz
(74) *Attorney, Agent, or Firm*—Venable LLP; Cameron H. Tousi

(57) ABSTRACT

An imaging module (1) comprises a lens holder (50) for holding a lens, and a foot (30) for holding an image sensor chip. Both the foot (30) and the lens holder (50) are provided with a flange (35, 52) having inclined contact surfaces (36, 53). In an assembled state, the lens holder (50) is snap-fitted over the foot (30). The lens holder (50) comprises slots (56), whereas the foot (30) comprises ribs (37). When the ribs (37) are received by the slots (56), rotation of the lens holder (50) with respect to the foot (30) is prohibited, whereas movement of the lens holder (50) with respect to the foot (30) in an axial direction is allowed. In this way, a maximum axial distance between the lens holder (50) and the foot (30) is determined, which may be set to be the focal distance of the lens.

19 Claims, 3 Drawing Sheets

Figure 1:
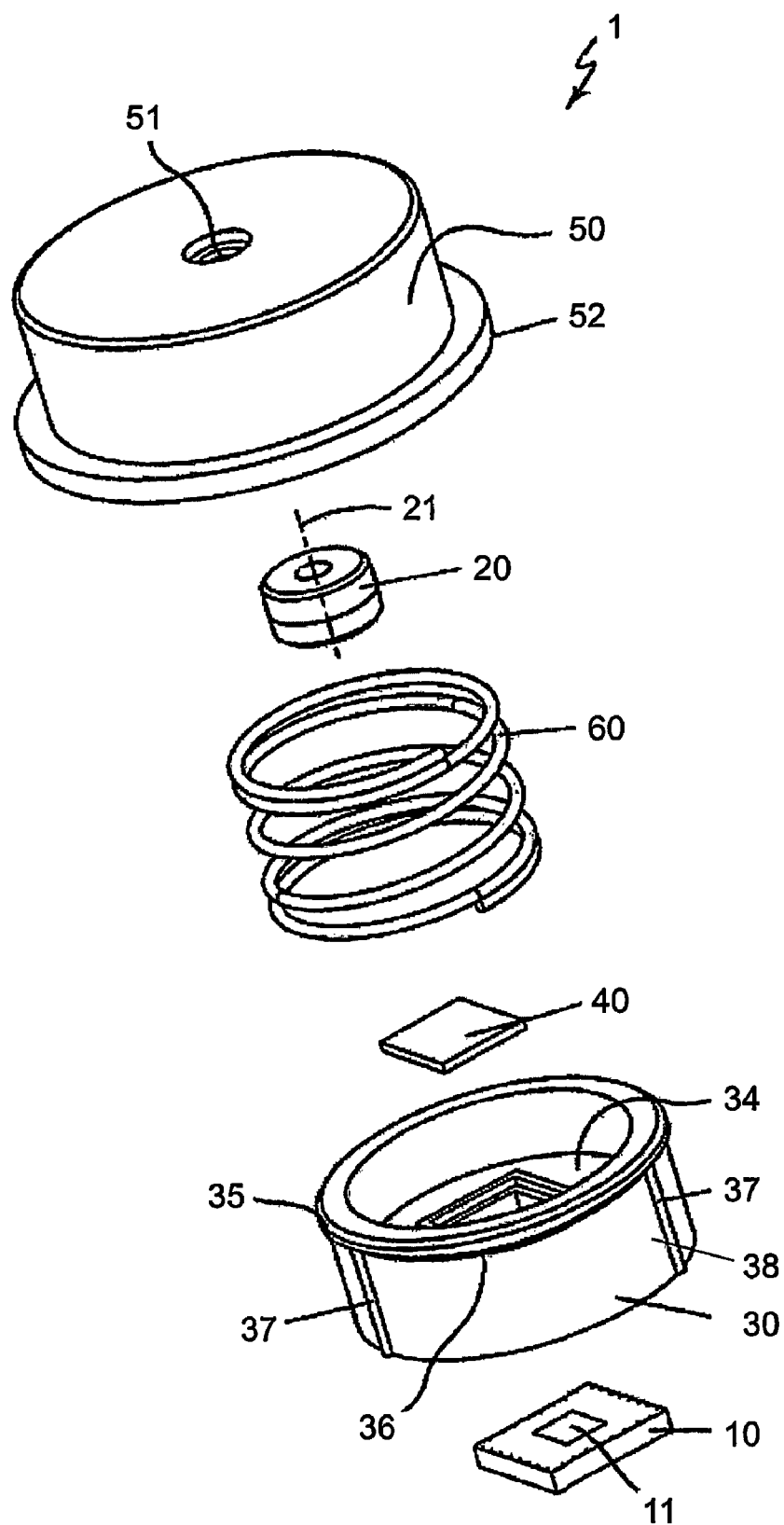

CAMERA COMPRISING MEANS FOR ACCURATELY FIXING THE DISTANCE BETWEEN A LENS AND AN IMAGE SENSOR CHIP

The present invention relates to an imaging module, comprising a lens holder holding a lens; and a foot holding an image sensor chip.

Such an imaging module is known, and may be part of for example a cellular phone. For the purpose of such an application of the imaging module, it is desirable that the height of the imaging module can be varied, in other words, that the lens holder and the foot are extractable and retractable with respect to each other. An imaging module having a variable height can be brought in an operative state by an extraction of the lens holder with respect to the foot, whereas the height of such an imaging module can be reduced when there is no need to make use of it. Further, for the purpose of obtaining sharp images, it is important that a distance between the lens and the image sensor chip in an operative state of the imaging module equals a focal distance of the lens.

It is an objective of the present invention to provide an imaging module having an accurately set distance between the lens and the image sensor chip, and preferably also a variable height The objective is achieved by means of an imaging module, comprising detachable locking means for fixing a mutual position of the lens holder and the foot with respect to each other in at least one direction.

During the manufacturing process of the imaging module according to the present invention, a distance between the lens and the image sensor chip can be varied by varying the position of the lens holder and the foot with respect to each other in an axial direction, that is a direction in which an axis of symmetry of the lens extends. In this way, the distance between the lens and the image sensor chip can be brought into conformity with a focal distance of the lens. Once the distance is set, it is desirable to fix the mutual position of the lens holder and the foot in such a way that the set distance is maintained, for at least one possible state of the imaging module. For this purpose, the imaging module according to the present invention comprises detachable locking means.

According to an important aspect of the present invention, it is only possible to detach the locking means and fasten the locking means again by subjecting these means to a relatively great force in the at least one direction. Consequently, under normal conditions, movement of the lens holder and the foot with respect to each other in the at least one direction is prevented by the locking means.

In the imaging module according to the present invention, coupling means are provided to couple the lens holder and the foot. In a preferred embodiment of the imaging module according to the present invention, such coupling means comprise flanges provided at both an under side of the lens holder and an upper side of the foot, wherein a spring is provided to press the lens holder in an outward axial direction with respect to the foot. The flanges can not move beyond each other, so that once contact between the flanges is established, an outward movement of the lens holder with respect to the foot is prohibited. Without the flanges, such an outward movement would take place under the influence of the spring.

According to an important aspect of the present invention, the coupling means are designed such as to bring about a movement of the lens holder with respect to the foot in the axial direction on rotation of the lens holder and the foot with respect to each other in a rotational direction, that is a direction about the axis of symmetry of the lens. In the above-described preferred embodiment of the present invention, in which the coupling means comprise flanges on both the under side of the lens holder and the upper side of the foot, a contact surface of at least one of the flanges is inclined, wherein the contact surface of the flange is defined as a surface which is destined for abutment against the other flange. During the manufacturing process of the imaging module, the distance between the lens and the image sensor chip is varied by means of a rotation of the lens holder and the foot with respect to each other. Once the required distance is found, it is desirable to prohibit any further rotation of the lens holder and the foot with respect to each other. For this purpose, the locking means are designed such as to prohibit such a mutual rotational movement. Further, in a suitable embodiment, the locking means do not prohibit movements of the lens holder and the foot with respect to each other in the axial direction, so that the lens holder may be extracted and retracted with respect to the foot, whereby the imaging module may be brought in an operative state and a non-operative state, respectively. The locking means may fix the mutual position of the lens holder and the foot in the rotational direction such that in an operative state of the imaging module, the distance between the lens and the image sensor chip equals the focal distance, and that in a non-operative state of the imaging module, the distance between the lens and the image sensor chip is smaller than the focal distance.

Figure 2:
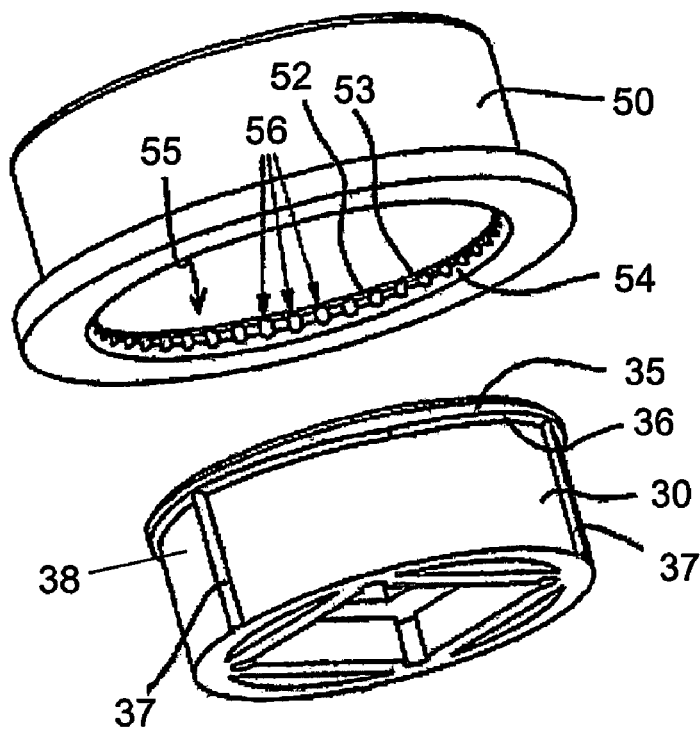
Figure 3:
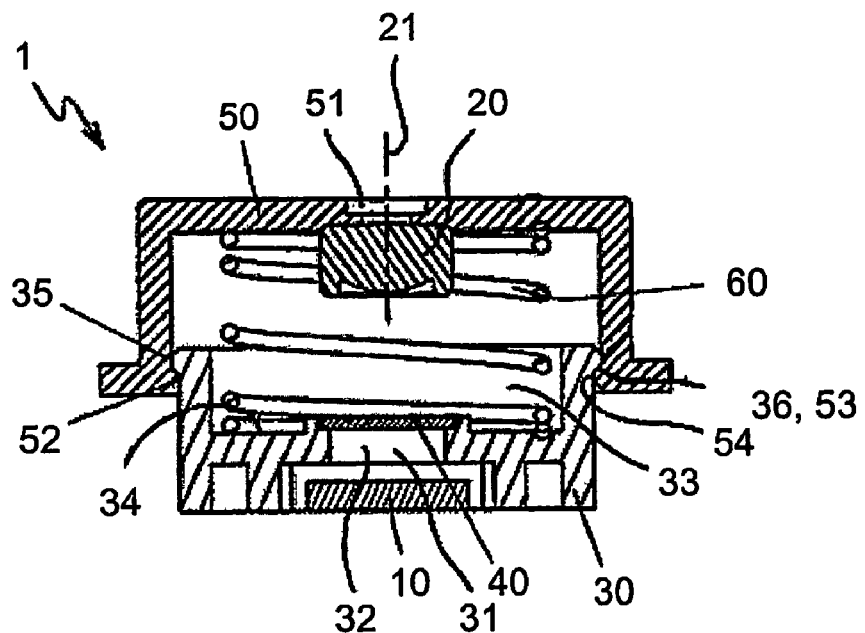

The present invention will now be explained in greater detail with reference to the figures, in which similar parts are indicated by the same reference signs, and in which:

FIG. 1 is an exploded view of a preferred embodiment of an imaging module according to the present invention, FIG. 2 is a perspective view of a lens holder and a foot of the imaging module as shown in FIG. 1, FIG. 3 is a sectional side view of the imaging module as shown in FIG. 1, wherein the imaging module is in an operative state, and FIGS. 4a-4d illustrate a principle underlying an adjustment of a distance between a lens and an image sensor chip of the imaging module.

In FIGS. 1 and 3, a preferred embodiment of an imaging module 1 according to the present invention is shown, whereas FIG. 2 shows two main components of the imaging module 1. The imaging module 1 comprises an image sensor chip 10 having a light-sensitive surface 11, and a lens 20. In FIGS. 1 and 3, an axis of symmetry of the lens 20 is indicated by means of reference numeral 21.

In the following, the terms "up" and "under" and derived terms relate to an orientation of the imaging module 1 as shown in FIGS. 1 and 3, wherein the image sensor chip 10 is positioned at an under side of the imaging module 1, while the lens 20 is positioned at an upper side of the imaging module 1. It will be understood that this definition is arbitrary, as the imaging module 1 may have a totally different orientation than the one as shown in FIGS. 1 and 3. This definition should therefore not be regarded as having a limiting effect on the scope of the present invention.

The imaging module 1 comprises a foot 30 having a substantially centrally positioned through hole 31. In the embodiment as shown in the FIGS. 1-3, the diameter of the hole 31 is not a constant. Instead, a middle portion 32 of the hole 31 has a smallest diameter and an upper portion 33 of the hole 31 has a largest diameter. At the transition between the upper portion 33 and the middle portion 32 of the hole 31, the foot 30 comprises an annular supporting inner surface 34. At the bottom of the hole 31, the image sensor chip 10 is positioned, whereas at the top of the middle portion of the hole 31, an infrared filter 40 is positioned. Besides a hole 31, the foot 30 further comprises an external flange 35, which is positioned at the top of the foot 30.

The lens 20 is held by a lens holder 50, which is substantially shaped as a hollow cylinder having one open end and one closed end. In the closed end, a through hole 51 is provided, and the lens 20 is positioned underneath that hole 51. It will be understood that the hole 51 is for letting through rays of light to the lens 20.

An under side of the lens holder 50 comprises an internal flange 52. During one step of the manufacturing process of the imaging module 1, the lens holder 50 is pressed onto the foot 30, until the lens holder 50 is temporarily deformed and the internal flange 52 moves beyond the external flange 35, in other words, until the lens holder 50 is snap-fitted over the foot 30.

The imaging module 1 according to the present invention comprises a helical spring 60, which extends between the lens holder 50 and the supporting surface 34 of the foot 30. The spring 60 is inclined to press the lens holder 50 away from the foot 30. Nevertheless, falling apart of the elements of the imaging module 1 is not possible, as the spring 60 is not able to press the internal flange 52 of the lens holder 50 in an outward direction beyond the external flange 35 of the foot 30.

According to an important aspect of the present invention, a height level of both a contact surface 36 of the external flange 35 and a contact surface 53 of the internal flange 52 is different for different positions in a rotational direction. As a result, a distance between the lens 20 and the image sensor chip 10 can be accurately set by means of a rotation of the lens holder 50 and the foot 30 with respect to each other.

Figure 4A:
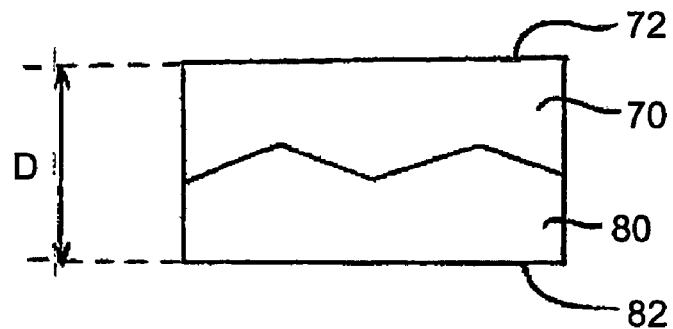
Figure 4B:
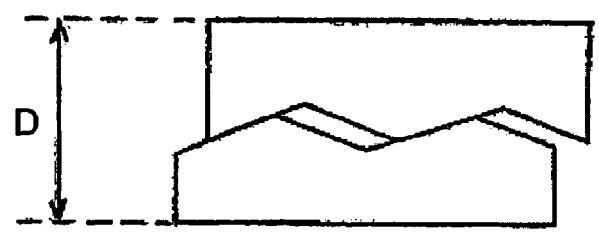

For the sake of clarity, a principle underlying the adjustment of the distance between the lens 20 and the image sensor chip 10 is illustrated by means of FIGS. 4a-4d. FIGS. 4a-4d are sectional side views of an upper block 70 representing the foot 30 and the external flange 35 and an under block 80 representing the lens holder 50 and the internal flange 52. Both an under surface 71 of the upper block 70, representing the contact surface 36 of the external flange 35, and an upper surface 81 of the under block 80, representing the contact surface 53 of the internal flange 52, have a toothed appearance. In a mutual position as shown in FIG. 4a, the toothed surfaces 71, 81 entirely abut against each other, such that there is no space between the surfaces 71, 81. Starting from the mutual position as shown in FIG. 4a, a mutual position as shown in FIG. 4b is obtained by moving the blocks 70, 80 with respect to each other, wherein contact between the blocks 70, 80 is maintained through the tips of the teeth of the surfaces 71, 81. A comparison of FIGS. 4a and 4b shows that the blocks 70, 80 are pressed apart as a result of the mutual movement, and that a distance D between an upper surface 72 of the upper block 70 and an under surface 82 of the under block 80 is increased.

Figure 4C:
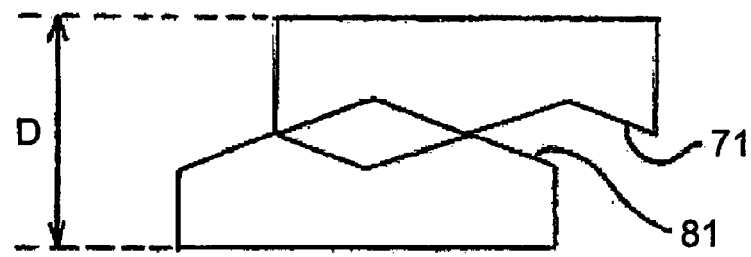
Figure 4D:
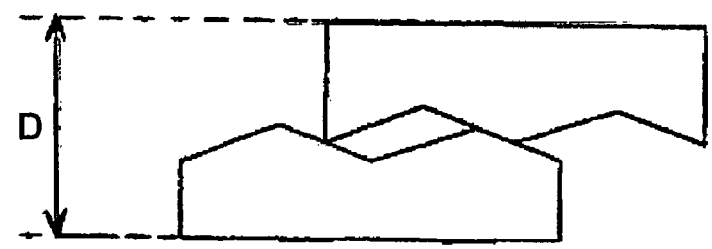

A result of a further mutual movement is shown in FIG. 4c. In the shown mutual position of the blocks 70, 80, the tips of the teeth abut against each other, and the distance D is at a maximum. By a further movement of the blocks 70, 80, a mutual position as shown in FIG. 4d is obtained, wherein the distance D is decreased with respect to the maximum.

As the mutual movement of the blocks 70, 80 is representative of a rotational movement of the internal flange 52 of the lens holder 50 and the external flange 35 of the foot 30 with respect to each other, it will be understood how contact surfaces 36, 53 can cause a mutual movement of the lens holder 50 and the foot 30 in an axial direction on a mutual movement in the rotational direction, provided that the contact surfaces 36, 53 are inclined with respect to planes extending perpendicular to the rotation axis of the movement.

During one step of the manufacturing process of the imaging module 1, the distance between the lens 20 and the image sensor chip 10 is varied by means of a rotation of the lens holder 50 and the foot 30 with respect to each other, until the distance between the lens 20 and the image sensor chip 10 equals a focal distance of the lens 20. Determining the focal distance may be performed in any suitable way, for example by moving the lens holder 50 towards the foot 30 while the sharpness of the image being generated by the image sensor chip 10 is checked at discrete intervals. Once the lens holder 50 appears to have the right position with respect to the foot 30, it is important to prohibit rotation of the lens holder 50 and the foot 30 with respect to each other, in order not to lose the set distance between the lens 20 and the image sensor chip 10.

For the purpose of prohibiting rotation of the lens holder 50 and the foot 30 with respect to each other, the imaging module 1 according to the present invention comprises a brake 55 which is arranged at an inner circumference 54 of the internal flange 52. In the shown example, the brake 55 comprises slots 56 which are evenly divided over the inner circumference 54 of the internal flange 52, in the rotational direction. Further, ribs 37 are provided on an outer surface 38 of the foot 30, extending from the external flange 35 to the bottom of the foot 30. The shape, dimensions and positions of the ribs 37 are such that a portion of the ribs 37 may be received by the slots 56 of the brake 55, in such a manner, that a relatively great force in the rotational direction is needed to free the ribs 37 from the brake 55 once the ribs 37 have been received by the slots 56.

During the manufacturing process of the imaging module 1 according to the present invention, the lens holder 50 and the foot 30 are forced to rotate with respect to each other in order to set the required distance between the lens 20 and the image sensor chip 10. For the purpose of the rotation, a relatively great force needs to be exerted in the rotational direction. It will be understood that in case the force is too small, the rotational movement will be prohibited by engagement of the brake 55 and the ribs 37. Once the distance between the lens holder 50 and the foot 30 is set, the associated position of the lens holder 50 with respect to the foot 30 in the rotational direction is fixed by means of an engagement of the brake 55 and the ribs 37. However, the ribs 37 are able to slide in the slots 56, such that a movement of the lens holder 50 and the foot 30 with respect to each other in the axial direction is not prohibited by the engagement of the brake 55 and the ribs 37. This is very advantageous, because in this way variation of the distance between the lens 20 and the image sensor chip 10 is allowed.

According to the state of the art, at a certain stage of the manufacturing process of an imaging module, the position of the lens holder 50 with respect to the foot 30 in the rotational direction is fixed by connecting the lens holder 50 permanently to the foot 30 by means of for example glue. An important advantage of the application of the brake 55 as shown is that there is no need to take additional measures in order to secure the mutual position of the lens holder 50 and the foot 30 in the rotational direction, once the required distance between the lens 20 and the image sensor chip 10 has been found. Further, according to the present invention, the possibility of adjusting the distance between the lens 20 and the image sensor chip 10 is maintained, whereas in an imaging module according to the state of the art, said distance can not be adjusted any more after the lens holder 50 and the foot 30 have been permanently attached to each other. Consequently, in cases in which it turns out that the distance is set wrongly during the manufacturing process, the imaging module 1 according to the present invention can be further adjusted, whereas the imaging module according to the state of the art can not be brought in a useful state.

In an operative state of the imaging module 1, the contact surfaces 36, 53 of the flanges 35, 52 abut against each other, and the distance between the lens 20 and the image sensor chip 10 is at a maximum. As already explained in the above, during the manufacturing process of the imaging module 1, this distance may be set to equal the focal distance of the lens 20, so that in the operative state of the imaging module 1, a sharp image may be obtained. The imaging module 1 can be brought in a non-operative state by pressing the lens holder 50 and the foot 30 towards each other, wherein the spring 60 is additionally compressed and the ribs 37 slide in the slots 56. Additional fixation means may be provided to keep the imaging module 1 in the non-operative state, which may for example be designed to engage the lens holder 50. It will be understood that the fixation means should be detachable, thereby offering a user the possibility of disengaging the lens holder 50 from the fixation means. As soon as the lens holder 50 is released, it is pressed in an outward direction with respect to the foot 30 under the influence of the spring 60, until the contact surfaces 36, 53 of the flanges 35, 52 abut against each other. As long as the imaging module 1 according to the present invention is in an operative state, the lens holder 50 is kept at an extracted position with respect to the foot 30 under the influence of the spring 60 exerting an upwardly directed pressure force on the lens holder 50.

It will be understood that the number of ribs 37 may be chosen freely within the scope of the present invention, as well as the number and shape of the slots 56. Preferably, the imaging module 1 according to the present invention comprises fewer ribs 37 than slots 56. It is important that the positions of the slots 56 are adjusted to the positions of the ribs 37, so that in case more than one rib 37 is provided, all ribs 37 can be simultaneously retained by a slot 56. It is also important that the shape of the slots 56 is such that the slots 56 are able to retain the ribs 37 in the rotational direction.

Further, it will be understood that it is also possible to provide protrusions on the inner circumference 54 of the internal flange 52 and longitudinal slots in the outer surface 38 of the foot 30 for receiving said protrusions.

It will be clear to a person skilled in the art that the scope of the present invention is not limited to the examples discussed in the foregoing, but that several amendments and modifications thereof are possible without deviating from the scope of the present invention as defined in the attached claims.

Another design of the imaging module 1 is possible, wherein the lens holder 50 is movable inside the foot 30, instead of over the foot 30 as shown. In such an alternative design, the lens holder 50 comprises an external flange, and the foot 30 comprises an internal flange. Further, ribs 37 and slots 56 are provided on an inner surface of the foot 30 and an outer circumference of the external flange of the lens holder 50.

Within the scope of the present invention, other suitable means than the shown inclined contact surfaces 36, 53 of the flanges 35, 52 may be used for adjusting the distance the lens 20 and the image sensor chip 10 by means of a rotation of the lens holder 50 and the foot 30 with respect to each other. Further, it may even be so that said distance is adjusted in another way. For example, the distance may be set by simply moving the lens holder 50 in the axial direction. The distance may then be fixed by means of a brake which prohibits mutual movement of the lens holder 50 and the foot 30 in the axial direction. It will be understood that such a way of setting and fixing the distance is less preferred than the way as illustrated by the figures, as in the former way, it is not possible to change the state of the imaging module 1 from operative to non-operative, and vice versa. In case such a brake is provided that a movement of the lens holder 50 and the foot 30 with respect to each other is allowed in the axial direction, extracting and retracting the lens holder 50 with respect to the foot 30 is possible, and the imaging module 1 may be applied in situations in which it is important to save space.

For the purpose of obtaining a detachable connection between the lens holder 50 and the foot 30, other suitable means than the shown combination of the brake 55 on the lens holder 50 and the ribs 37 on the foot 30 may be provided. Preferably, means are provided by means of which a detachable snap connection between the lens holder 50 and the foot 30 may be obtained, at different mutual positions of the lens holder 50 and the foot 30. In a suitable embodiment, the forces needed for disengaging the lens holder 50 from the foot 30 are larger than the forces normally acting on the imaging module 1 during use thereof, so that unexpected disengagement of the lens holder 50 and the foot 30 is avoided.

In the foregoing, an imaging module 1 comprising a lens holder 50 for holding a lens 20 as well as a foot 30 for holding an image sensor chip 10 is described. Both an upper side of the foot 30 and an under side of the lens holder 50 are provided with a flange 35, 52 having inclined contact surfaces 36, 53. In an assembled state, the lens holder 50 is snap-fitted over the foot 30, wherein the flanges 35, 52 are not able to move beyond each other, and wherein the lens holder 50 is extractable and retractable with respect to the foot 30.

At an inner circumference 54 of the flange 52 of the lens holder 50, a brake 55 comprising slots 56 is provided. Further, ribs 37 are provided on an outer surface 38 of the foot 30. When the ribs 37 are received by the slots 56, rotation of the lens holder 50 with respect to the foot 30 is prohibited, whereas movement of the lens holder 50 with respect to the foot 30 in an axial direction is allowed.

The mutual position of the lens holder 50 and the foot 30 in a rotational direction is fixed by means of an engagement of the slots 56 and the ribs 37. As the contact surfaces 36, 53 of the flanges 35, 52 are inclined, a maximum axial distance between the lens holder 50 and the foot 30 is determined, which may be set to be the focal distance of the lens 20.

The invention claimed is:

1. Imaging module, comprising
a lens holder holding a lens;
a foot holding an image sensor chip; and
a detachable locking structure for fixing a mutual position of the lens holder and the foot with respect to each other in at least one direction, wherein the locking structure allows the foot to slide along an inner surface of the lens holder while preventing any rotation of the foot with respect to the lens holder,
wherein the locking structure utilizes a snap connection between the lens holder and the foot.

2. Imaging module according to claim 1, wherein the locking structure comprises at least one rib, provided on one of the foot and the lens holder, as well as at least one slot for receiving and retaining the rib, provided in another of the foot and the lens holder.

3. Imaging module according to claim 1, wherein the lens holder has a cup-like structure defined by an annular wall and a base, wherein the base has an opening therethrough, and wherein the lens is positioned in an inner volume of the lens holder against the base and adjacent to the opening.

4. Imaging module according to claim 1, wherein the locking structure allows a movement of the lens holder and the foot with respect to each other in an axial direction.

5. Imaging module according to claim 1, further comprising a biasing structure for biasing the lens holder and the foot to a maximum axial distance with respect to each other.

6. Imaging module, comprising:
   a lens holder holding a lens;
   a foot holding an image sensor chip;
   a detachable locking structure for fixing a mutual position of the lens holder and the foot with respect to each other in at least one direction; and
   a coupling structure for coupling the lens holder and the foot,
   wherein the locking structure utilizes a snap connection between the lens holder and the foot, and
   wherein the coupling structure allows movement of the lens holder with respect to the foot in an axial direction, and rotation of the lens holder and the foot relatively to each other in a rotational direction.

7. Imaging module according to claim 6, wherein the coupling structure comprises a flange on the foot as well as a flange on the lens holder, wherein both flanges comprise a contact surface, and wherein the contact surfaces abut against each other when the lens is at a maximum axial distance from the image sensor chip.

8. Imaging module according to claim 7, wherein the contact surface of at least one of the flanges is inclined with respect to a plane extending perpendicular to an axial direction.

9. A mobile phone, comprising:
   a lens holder holding a lens;
   a foot holding an image sensor chip; and
   a locking structure for fixing a mutual position of the lens holder and the foot with respect to each other in at least one direction while allowing movement in an axial direction, wherein the lens holder has a wall and a base defining an inner volume, wherein the base has an opening therethrough, and wherein the lens is positioned in the inner volume of the lens holder against the base and adjacent to the opening,
   wherein the locking structure utilizes a snap connection between the lens holder and the foot.

10. The mobile phone of claim 9, wherein the lens holder and the foot are prevented from any rotation with respect to each other by a coupling structure.

11. The mobile phone of claim 9, wherein the locking structure comprises at least one rib, provided on one of the foot and the lens holder, as well as at least one slot for receiving and retaining the rib, provided in another of the foot and the lens holder.

12. The mobile phone of claim 9, further comprising a flange on the foot as well as a flange on the lens holder, wherein both flanges comprise a contact surface, and wherein the contact surfaces abut against each other when the lens is at a maximum axial distance from the image sensor chip.

13. The mobile phone of claim 12, wherein the contact surface of at least one of the flanges is inclined with respect to a plane extending perpendicular to an axial direction.

14. The mobile phone of claim 9, further comprising a biasing structure for biasing the lens holder and the foot to a maximum axial distance with respect to each other.

15. An imaging module, comprising:
   a lens holder holding a lens;
   a foot holding an image sensor chip;
   a locking structure for fixing a mutual position of the lens holder and the foot with respect to each other in at least one direction while allowing movement in an axial direction; and
   a coupling structure comprising a flange on the foot as well as another flange on the lens holder,
   wherein the lens holder and the foot are connected by a snap connection, and
   wherein both of the flanges comprise a contact surface, and wherein the contact surfaces abut against each other when the lens is at a maximum axial distance from the image sensor chip.

16. The imaging module of claim 15, wherein the lens holder has a wall and a base defining an inner volume, wherein the base has an opening therethrough, and wherein the lens is positioned in the inner volume of the lens holder against the base and adjacent to the opening.

17. The imaging module of claim 15, wherein the foot slides along an inner surface of the lens holder while being prevented from any rotation with respect to the lens holder by a coupling structure.

18. The imaging module of claim 15, wherein the locking structure comprises at least one rib, provided on one of the foot and the lens holder, as well as at least one slot for receiving and retaining the rib, provided in another of the foot and the lens holder.

19. The imaging module of claim 15, further comprising a biasing structure for biasing the lens holder and the foot to a maximum axial distance with respect to each other.

* * * * *